Feb. 12, 1952     C. W. BRANDON     2,585,621

SELF-LOCKING BOLT OR CAP SCREW

Filed Nov. 10, 1947

Clarence W. Brandon
*INVENTOR.*

BY *Clarence A. O'Brien
and Harvey B. Jacobson*
Attorneys

Patented Feb. 12, 1952

2,585,621

UNITED STATES PATENT OFFICE 2,585,621

SELF-LOCKING BOLT OR CAP SCREW

Clarence W. Brandon, Tallahassee, Fla., assignor of sixteen and two-thirds per cent to N. A. Hardin, sixteen and two-thirds per cent to Hazel H. Wright, and sixteen and two-thirds per cent to Catherine H. Newton Application November 10, 1947, Serial No. 785,139

2 Claims. (Cl. 151—7)

1

This invention comprises novel and useful improvements in a self-locking bolt or cap screw and more specifically pertains to an improved method and structure for providing a self-locking bolt or screw, and for simultaneously or optionally providing an effective fluid pressure sealing construction at one or more zones upon the screw-threaded portion of the bolt member.

A prime feature of the invention is the provision of a deformable, resilient sealing and locking member inserted in suitable cavities, grooves or recesses in a bolt or other screw-threaded member for establishing sealing zones between the cooperating threads of the bolt and its nut member when these elements are assembled.

A further important feature of the invention comprehends the securing of the sealing element to the bolt member in such a manner that the same may be securely retained thereto until the device is ready for use, without danger of accidental or unintentional removal of the sealing and locking element.

A further important feature of the invention resides in the provision of a sealing and locking element as above set forth, wherein the application of the bolt to a nut will result in a deformation and compression of the sealing element to cause a constant tensioning of the sealing element in its engagement with the nut member.

A further important feature of the invention consists in providing deformed sections of the bolt, together with cavities therein for receiving a deformable sealing and locking element, whereby the engagement of a nut member upon the bolt will deform the same together with the sealing element for establishing a compressed, resilient seal and locking engagement between the threads of the nut and bolt members.

Another important feature of the invention includes the formation of the cavities in the bolt and the shape of the sealing element such that a dovetailed or self-locking engagement of these members is established.

Another very important feature of the invention contemplates the mounting of the sealing and locking element upon the exterior surface of the bolt member in enlarged threads thereof, with the ends of the sealing member inserted in bores in the bolt body for retaining engagement.

These, together with various ancillary objects of the invention which will later become apparent as the following description proceeds, are attained by this device, various embodiments of which have been illustrated by way of example

2 of the principles of the invention only in the accompanying drawings, wherein:

In industry, it frequently becomes desirable to establish a fluid-tight seal, and/or a vibration-tight engagement between bolt and nut members or other similar screw-threadedly engaged elements, especially where the engagement of the members is in a location which is subjected to excessive vibration, fluid pressure or the like, and where other sealing or tightening means extraneous to the nut and bolt members may not readily be applied. The features of this invention are particularly adapted to such specialized uses and environments.

In the accompanying drawings, wherein like numerals designate similar parts throughout the various views, there has been illustrated at 10 a portion of the threaded shank of a bolt, or other similar screw-threaded member, upon which it is desired to fasten a nut or equivalent element, not shown, and for establishing a self-locking seal or a fluid-tight seal or both between the nut and bolt members.

In this adaptation of the invention, the bolt-like member 10 is provided with one or more circumferential grooves 12 thereabout, which may extend partly or entirely around the circumference of the bolt as desired. The threads immediately adjacent this groove are diametrically enlarged as at 14, to extend slightly beyond the groove, and an annular sealing member 16 which may be of one-piece or of arcuate sectional construction, and which is received within the groove 12.

Figure 1:
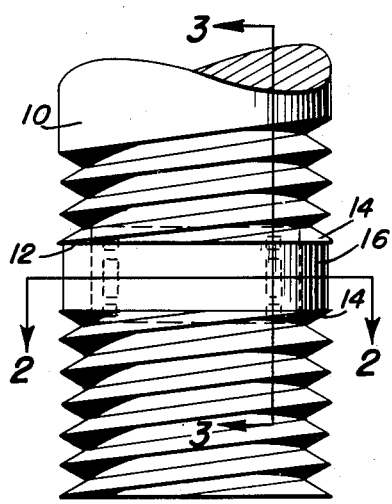
Figure 1 is an elevational view, parts being broken away and shown in section, of a portion of a bolt member showing one manner of applying the invention thereto.
Figure 2:
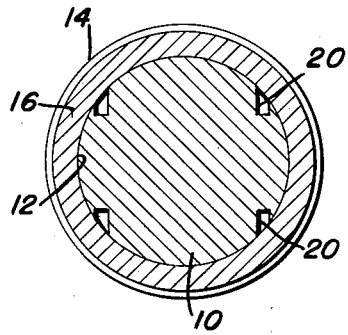
Figure 2 is a horizontal sectional view taken through the embodiment of Figure 1, substantially upon the plane of the section line 2—2 thereof; and, Figure 3 is a further detailed sectional view taken in vertical section substantially upon the plane of the section line 3—3 of Figure 1.
Figure 3:
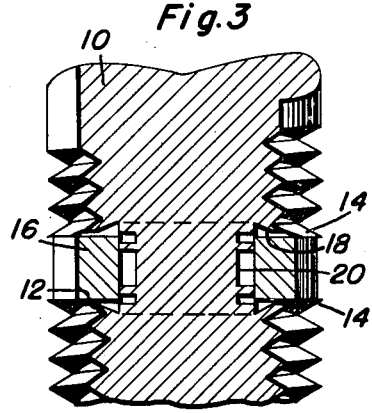

Preferably, the walls of the groove 12 are undercut, that is, their width is greater at the bottom or depth of the groove than at the top surface thereof. This undercut construction is indicated more clearly by the numeral 18 in Figure 3. In cross-sectional area, the groove thus is of trapezoidal shape, with its bottom of the greatest width. As shown in Figures 1-3, tangentially disposed sockets or recesses 20 extend from the sides of the groove 12, into the body portion of the bolt 10, for a purpose to be now set forth.

In this form of the invention, when a nut is screwed upon the bolt and engages the deformable sealing strip 16, the threads of the nut force the adjacent enlarged threads 14 of the bolt over upon the sealing strip 16, and deform the latter into sealing engagement with the undercut walls 18 of the groove, and also force a portion of the material into the socket 20. By this means, the sealing strip or the segments making up the same, are securely wedged and swaged into a tight retaining engagement in the groove 12 and to prevent unintentional removal of the sealing member therefrom, and also into the socket 20 to prevent rotational movement of the strip 16 or its segments.

This construction thus provides a very satisfactory fluid-tight seal for members which are intended to be repeatedly secured together and removed therefrom, and also insures a constantly tensioned locking or non-slipping means between the nut and the bolt members.

From the foregoing, the principles of the invention should be readily understood, and further explanation is believed to be unnecessary.

However, since numerous modifications of the principles of this invention will readily occur to those skilled in the art after a consideration of the foregoing specification and annexed drawings, it is not intended to limit the invention to the exact construction shown and described, since these are to be regarded as illustrative of the principles of the invention only; and all suitable modifications and equivalents may be resorted to falling within the scope of the appended claims.

Having described the invention what is claimed as new is:

1. An anti-vibration self-sealing bolt comprising a threaded shank, said shank having a circumferentially extending annular recess in its periphery intermediate the ends of the threads of the shank, the walls of said recess being undercut, a ring of compressible sealing material in said recess, means for retaining said ring of compressible sealing material in said recess, said retaining means including adjacent threads on opposite sides of said recess being diametrically enlarged and deformable for compressive bearing engagement upon said ring.

2. The combination of claim 1 including anchoring means for securing said ring of compressible sealing material in said recess against displacement, said anchoring means comprising anchoring recesses in the bottom of said first mentioned recess.

CLARENCE W. BRANDON.

REFERENCES CITED

The following references are of record in the file of this patent:

UNITED STATES PATENTS

| Number | Name | Date |
|---|---|---|
| 534,164 | Larsh | Feb. 12, 1895 |
| 1,893,067 | Arenz | Jan. 3, 1933 |
| 1,909,400 | Hall | May 16, 1933 |
| 2,159,866 | Simmonds | May 23, 1939 |
| 2,190,174 | MacDonald | Feb. 23, 1940 |
| 2,318,415 | Patzschke | May 4, 1943 |
| 2,398,838 | Miller | Apr. 23, 1946 |
| 2,407,160 | Kahn | Sept. 3, 1946 |
| 2,520,121 | Brutus | Aug. 29, 1950 |
| 2,539,887 | Boots | Jan. 30, 1951 |

FOREIGN PATENTS

| Number | Country | Date |
|---|---|---|
| 490,680 | Great Britain | Aug. 18, 1938 |
| 496,638 | Great Britain | Dec. 2, 1938 |
| 504,853 | Great Britain | May 2, 1939 |
| 517,584 | Great Britain | Feb. 2, 1940 |